(12) United States Patent
Uenishi

(10) Patent No.: US 9,398,206 B2
(45) Date of Patent: Jul. 19, 2016

(54) FOCUS ADJUSTMENT APPARATUS, FOCUS ADJUSTMENT METHOD AND PROGRAM, AND IMAGING APPARATUS INCLUDING FOCUS ADJUSTMENT APPARATUS

(71) Applicant: CANON KABUSHIKI KAISHA, Tokyo (JP)

(72) Inventor: Masaaki Uenishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 14/539,100

(22) Filed: Nov. 12, 2014

(65) Prior Publication Data
US 2015/0130988 A1    May 14, 2015

(30) Foreign Application Priority Data
Nov. 14, 2013    (JP) .................. 2013-236000

(51) Int. Cl.
  *H04N 5/232*    (2006.01)
  *G03B 13/00*    (2006.01)
  *H04N 5/353*    (2011.01)
  *H04N 5/3745*   (2011.01)
(52) U.S. Cl.
  CPC .......... *H04N 5/23212* (2013.01); *H04N 5/3532* (2013.01); *H04N 5/3745* (2013.01)
(58) Field of Classification Search
  CPC ............. G03B 3/00; G03B 13/36; G02B 7/09
  USPC ........................................ 348/345, 349–355
  See application file for complete search history.

(56) References Cited

U.S. PATENT DOCUMENTS

| 7,834,911 | B2 | 11/2010 | Muraki | |
|---|---|---|---|---|
| 2008/0002960 | A1* | 1/2008 | Ito | G03B 13/36 396/125 |
| 2008/0136959 | A1* | 6/2008 | Sasaki | G02B 7/36 348/353 |
| 2013/0182172 | A1* | 7/2013 | Suzuki | G02B 7/28 348/345 |
| 2015/0029387 | A1* | 1/2015 | Kawai | H04N 5/23212 348/347 |

FOREIGN PATENT DOCUMENTS

JP    2007-097033    4/2007

* cited by examiner

*Primary Examiner* — Kelly L Jerabek
(74) *Attorney, Agent, or Firm* — Fitzpatrick, Cella, Harper & Scinto

(57) ABSTRACT

A focus adjustment apparatus that, based on imaging signals obtained by picking up an optical image of an object formed via a photographing optical system including a focus lens, adjusts a position of the focus lens, reads out, in parallel with an operation of reading out first imaging signals at a predetermined frame rate, second imaging signals at a frame rate that is higher than the predetermined frame rate, the number of the second imaging signals being smaller than the number of the first imaging signals, generates first and second focus signals using the first and second imaging signals, and performs first focus adjustment according to determination of the focus state based on the first focus signal and second focus adjustment according to determination of the focus state based on the second focus signal to determine an in-focus position of the focus lens.

12 Claims, 13 Drawing Sheets

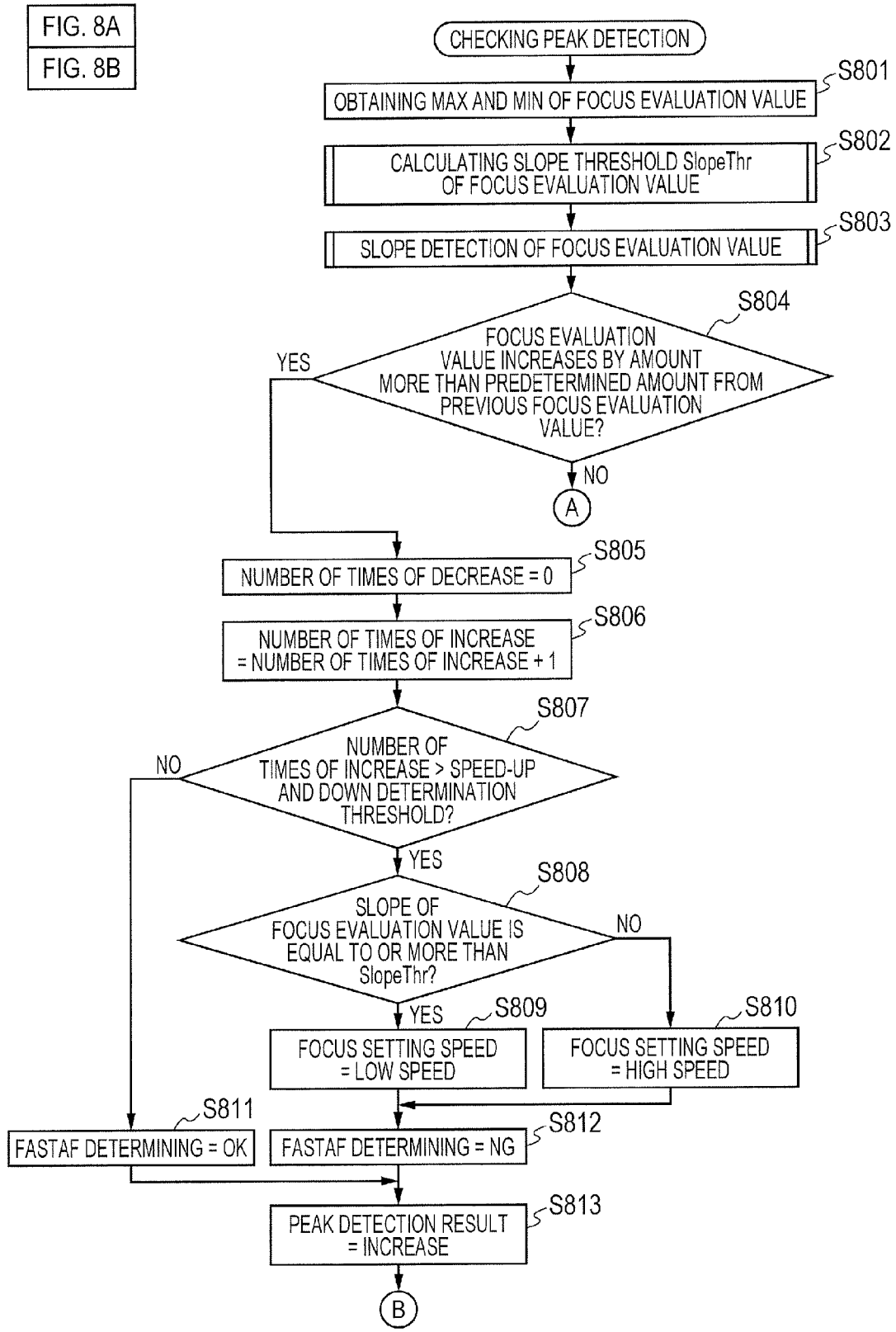

FOCUS ADJUSTMENT APPARATUS, FOCUS ADJUSTMENT METHOD AND PROGRAM, AND IMAGING APPARATUS INCLUDING FOCUS ADJUSTMENT APPARATUS

BACKGROUND OF THE INVENTION

1. Field of the Invention

The present invention relates to a focus adjustment apparatus that performs focus adjustment using image signals obtained by subjecting an object image formed via an imaging optical system to photoelectric conversion by an imaging element, and an imaging apparatus including the focus adjustment apparatus.

2. Description of the Related Art

Conventionally, as a method for focusing on an object by moving a focus lens, electronic still cameras and the like employ autofocusing (AF) with which focusing operation is automatically performed based on image signals obtained from an imaging element such as a CCD or CMOS. With the AF, if a focus evaluation value is generated using signals from all of pixels obtained from the imaging element, it takes much time for readout. Therefore, there is known a technique that reduces readout time to achieve high-speed AF using image signals obtained by adding up pixel signals of every predetermined number of pixels in a predetermined direction of an image region for thinning out the pixel signals at intervals of the predetermined number of pixels (hereinafter, "thinned-out addition signals"). However, the addition and thinning-out of the pixel signals affect the frequency characteristics of the image signals, resulting in a difference in peak position between the focus evaluation value calculated from image signals obtained from all of the pixels (hereinafter, "non-adding signals") and the focus evaluation value calculated from the thinned-out addition signals as illustrated in FIG. 12. Consequently, in a case where an image is formed from the signals of all pixels, it is impossible to bring the image into focus even if AF is performed at high speed using the focus evaluation value calculated using the thinned-out addition signals.

There is also known a technique with which two imaging elements are provided, image data is alternately output from the two imaging elements, one of the data is used for control to take a moving image and the other data is used for AF control, and speed enhancement is achieved in the AF control by exposure control suitable for AF as well as pixel addition (Japanese Patent Application Laid-Open No. 2007-097033).

The method in Japanese Patent Application Laid-Open No. 2007-097033 requires the two imaging elements, resulting in an increase in apparatus size and cost. Moreover, in the method in which image data is alternately output from the two imaging elements, both sets of image data cannot be used simultaneously. Furthermore, Patent Application Laid-Open No. 2007-097033 includes no consideration of defocusing that occurs when AF control is performed using the signals resulting from the aforementioned pixel addition.

Therefore, an object of the present invention is to provide a focus adjustment apparatus that can perform high-speed AF with AF accuracy maintained, by performing AF control using a focus evaluation value generated from non-adding signals and a focus evaluation value generated from thinned-out addition signals, which are simultaneously output from one imaging element.

SUMMARY OF THE INVENTION

The present invention provides a focus adjustment apparatus that, based on imaging signals obtained by causing an imaging unit to pick up an optical image of an object formed via a photographing optical system including a focus lens, adjusts a position of the focus lens, the apparatus including: a read out control unit that performs control so that, in parallel with an operation of reading out first imaging signals from the imaging unit at a predetermined frame rate, second imaging signals are read out from the imaging unit at a frame rate that is higher than the predetermined frame rate, a number of the second imaging signals being smaller than the number of the first imaging signals; a generation unit that generates a first focus signal using the first imaging signals and that generates a second focus signal, using the second imaging signals; and a control unit that performs control so that first focus adjustment that adjusts the position of the focus lens based on the first focus signal is performed if it is determined that the focus lens is near an in-focus position, and so that second focus adjustment that adjusts the position of the focus lens based on the second focus signal is performed if it is determined that the focus lens is not near the in-focus position.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Preferred embodiments of the present invention will now be described in detail in accordance with the accompanying drawings.

An exemplary embodiment of the present invention will be described in detail below with reference to FIGS. 1 to 11.

Figure 1:
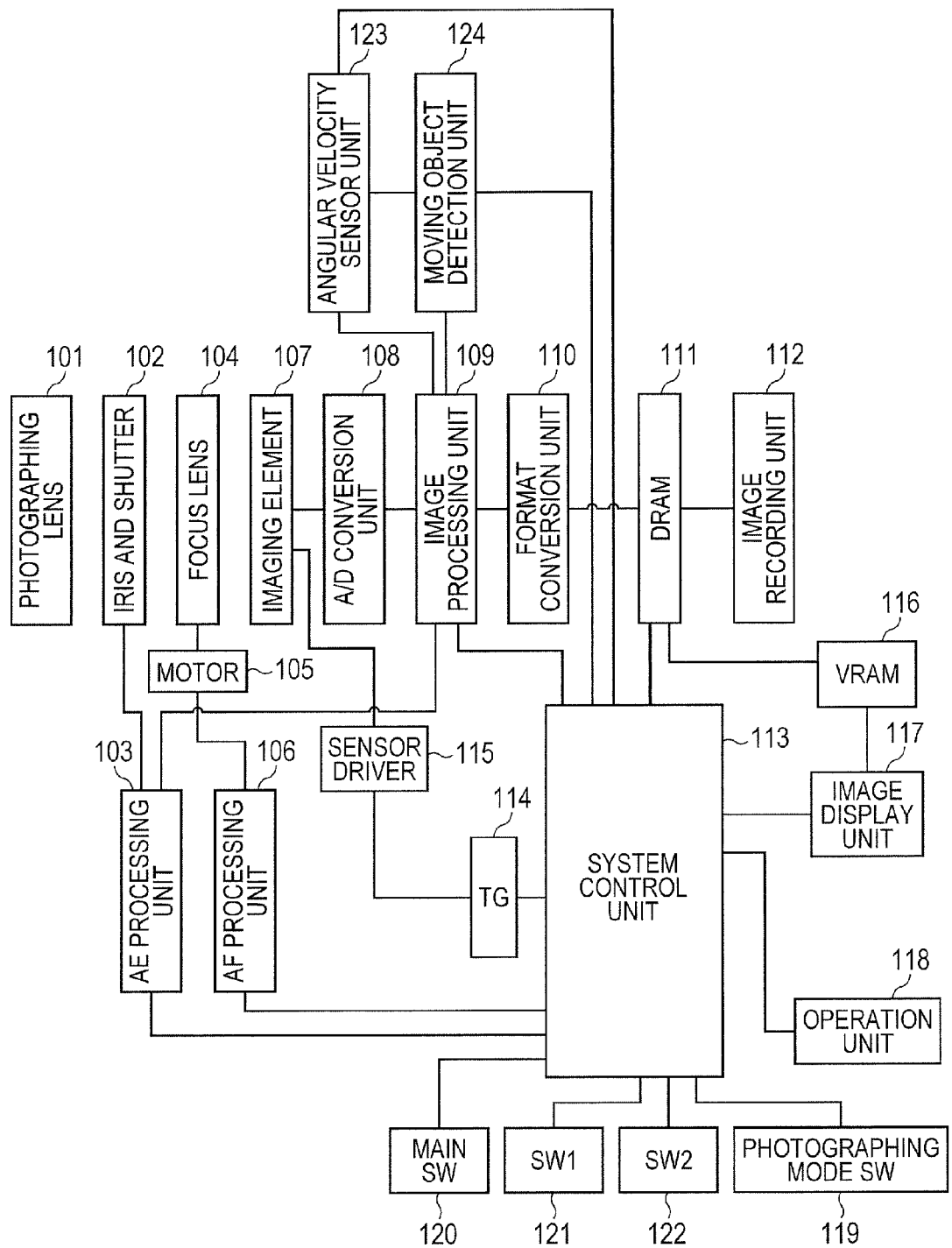
FIG. 1 is a block diagram illustrating a configuration of an imaging apparatus that employs a focus adjustment apparatus according to an exemplary embodiment of the present invention.

FIG. 1 is a block diagram illustrating a configuration of an imaging apparatus that employs a focus adjustment apparatus according to an exemplary embodiment of the present invention. Here, the imaging apparatus is an imaging apparatus used in, for example, a digital still camera, a digital video camera or a mobile phone; however, a focus adjustment apparatus according to the present invention can also be employed in any of those including an optical system and a control system that enable provision of an AF function, other than the above.

In FIG. 1, reference numeral 101 denotes a photographing lens including a zoom mechanism, reference numeral 102 denotes an iris and shutter that controls an amount of light, reference numeral 103 denotes an AE processing unit, reference numeral 104 denotes a focus lens for putting a focal point on a later-described imaging element, and reference numeral 105 denotes a motor that drives the focus lens. Reference numeral 106 denotes an AF processing unit, reference numeral 107 denotes an imaging element, which is a photoelectric conversion unit (imaging unit) that converts an optical image of an object into an electrical signal, and reference numeral 108 denotes an A/D conversion unit including a CDS circuit that removes output noise from the imaging element 107 and a non-linear amplifier circuit that performs non-linear amplification before A/D conversion. Also, reference numeral 109 denotes an image processing unit, reference numeral 110 denotes a format conversion unit, reference numeral 111 denotes a high-speed internal memory (for example, a random access memory; hereinafter referred to as "DRAM"), and reference numeral 112 denotes an image recording unit including a recording medium such as a memory card and an interface for the recording medium. Reference numeral 113 denotes a system control unit (hereinafter, "CPU") that controls the entire system of the imaging apparatus in order to perform, e.g., an imaging sequence, reference numeral 114 denotes a timing generator (hereinafter, "TG") that generates predetermined timing signals, and reference numeral 115 denotes a sensor driver. The system control unit 113 loads a program stored in a memory (not shown) to a memory in the CPU and executes the program, thereby controlling the respective units of the imaging apparatus including a focus detection device to realize various operations. Reference numeral 116 denotes a memory for image display (hereinafter, "VRAM"), reference numeral 117 denotes an image display unit that, in addition to image display, displays a photographing screen and a distance measurement area during photographing as well as display for operation assistance and display of a state of the camera, and reference numeral 118 denotes an operation unit for externally operating the camera. Reference numeral 119 denotes a photographing mode switch for selecting any of photographing modes such as a macro mode and a long-distance mode, reference numeral 120 denotes a main switch for turning on the power of the system, and reference numeral 121 denotes a switch (hereinafter, "SW1") for performing a photographing preparation operation in, e.g., AF or AE. Also, reference numeral 122 denotes a photographing switch (hereinafter, "SW2") for performing photographing after operating the SW1. Reference numeral 123 denotes an angular velocity sensor unit for detecting movements of the camera due to, e.g., vibration of the imaging apparatus or panning, and reference numeral 124 denotes a moving object detection unit that detects a moving object according to information on brightness on the screen. Predetermined timing signals are output from the TG 114 to the CPU 113 and the sensor driver 115, and the CPU 113 controls various operations in synchronization with the timing signals. Also, the sensor driver 115 receives timing signals from the TG 114, and drives the imaging element 107 in synchronization with the timing signals. The DRAM 111 is used as, e.g., a high-speed buffer, which is a temporary image storage unit, or a work memory for image compression/expansion. The operation unit 118 includes, for example, the following switches, etc.: a menu switch for various settings such as settings for a photographing function of the imaging apparatus and image reproduction and settings for details of each photographing mode, a zoom lever for providing an instruction for a zoom operation of the photographing lens, and an operation mode change switch for selection between a photographing mode and a reproduction mode. The photographing mode switch 119 is configured to change, e.g., a distance measurement range scale and/or an AF operation according to a photographing mode selected by a user.

Figure 2:
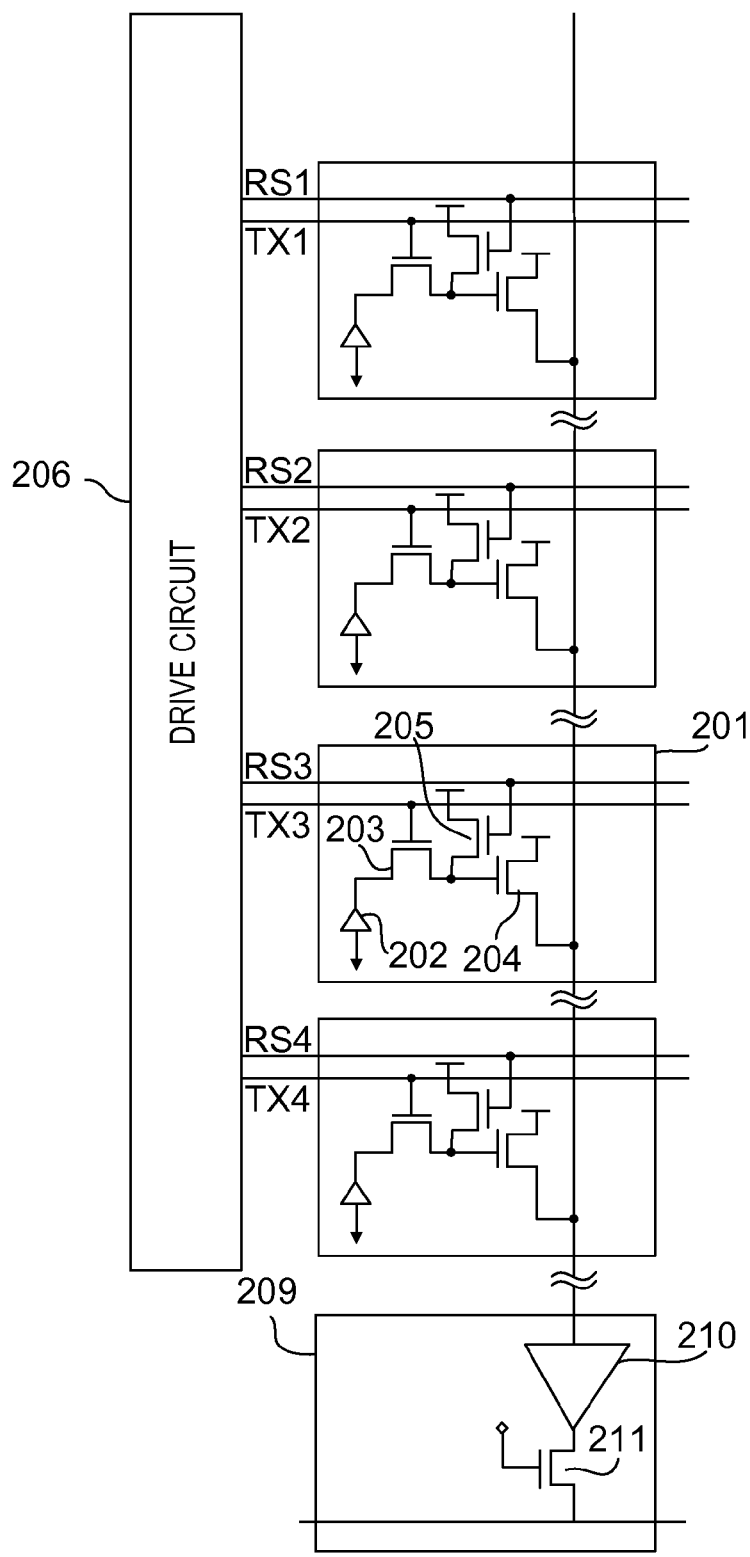
FIG. 2 is a diagram for describing a configuration of an imaging element used in the imaging apparatus that employs the focus adjustment apparatus according to the exemplary embodiment of the present invention.

Next, FIG. 2 illustrates a configuration of a pixel unit including a plurality of pixels two-dimensionally arrayed on a light receiving plane of the imaging element 107 illustrated in FIG. 1. In the Figure, for ease of description, only pixels in four rows and one column and a drive configuration therefor are illustrated; however, in reality, pixels in numerous rows and columns are arrayed together with a drive configuration therefor.

In the Figure, reference numeral 201 denotes pixels that receive an optical image of an object formed via a photographing optical system including the photographing lens 101, the iris and shutter 102 and the focus lens 104, and a two-dimensional array of the pixels 201 forms a pixel unit. Each pixel performs photoelectric conversion of incoming light to output an electrical signal (imaging signal), and includes a photodiode 202, a transfer transistor 203, a signal amplifier 204, and a signal reset transistor 205. The transfer transistor 203 and the signal reset transistor 205 operate in response to signals from a drive circuit 206 connected to the imaging element 107. Here, the drive circuit 206 includes, e.g., a shift register, and a signal generation circuit that drives the transfer transistor 203, etc., in each pixel 201. As a result of controlling the transfer transistors 203 and the signal reset transistors 205 by generated timing signals (e.g., TX1 to TX4 and RS1 to RS4), charges in the photodiodes are reset or read out. Consequently, the exposure time is controlled. As described above, numerous pixels 201 are arranged in two dimensions.

Also, reference numeral 209 denotes a horizontal scanning circuit including, e.g., a shift register, a column amplifier circuit 210, a signal output selection switch 211 and a circuit for external output (not illustrated). Here, a setting for the column amplifier circuit 210 is changed by a signal from the sensor driver 115, enabling signals read out from the pixels to be amplified. Furthermore, settings can be made to perform readout control so that all of pixel signals are read out in response to timing signals of one type (for example, RS1 to RS4) and pixel signals are added up at predetermined pixel count intervals in a horizontal direction of the pixel array for thinning out in response to timing signals of the other type (for example, TX1 to TX4) and both pixel signals can be output simultaneously. The focus adjustment apparatus according to the exemplary embodiment enables high-speed focus adjustment (adjustment of a position of the focus lens) with good accuracy by obtaining and properly using a non-adding signal and a thinned-out addition signal read out simultaneously.

Next, an operation to take a normal image in the imaging apparatus in FIG. 1 will be described.

Figure 3:
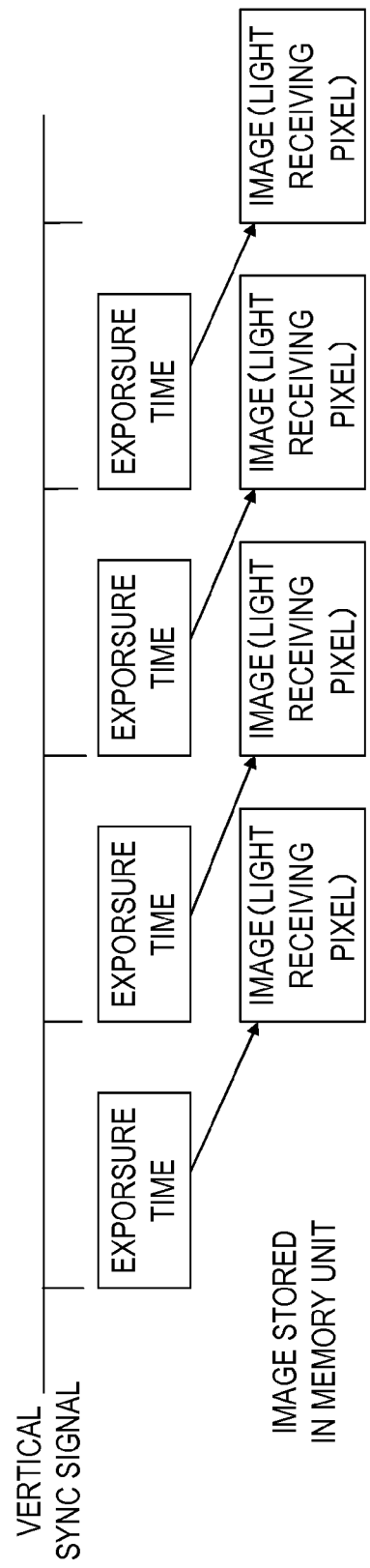
FIG. 3 is a diagram illustrating a timing chart where a normal image is obtained by the imaging apparatus that employs the focus adjustment apparatus according to the exemplary embodiment of the present invention.

FIG. 3 is a timing chart where a normal image is obtained by the imaging apparatus according to the exemplary embodiment. As illustrated in the Figure, according to a vertical sync signal generated by the TG 114 and the sensor driver 115, exposure and pixel signal readout are performed under the control of the CPU 113.

Figure 4:
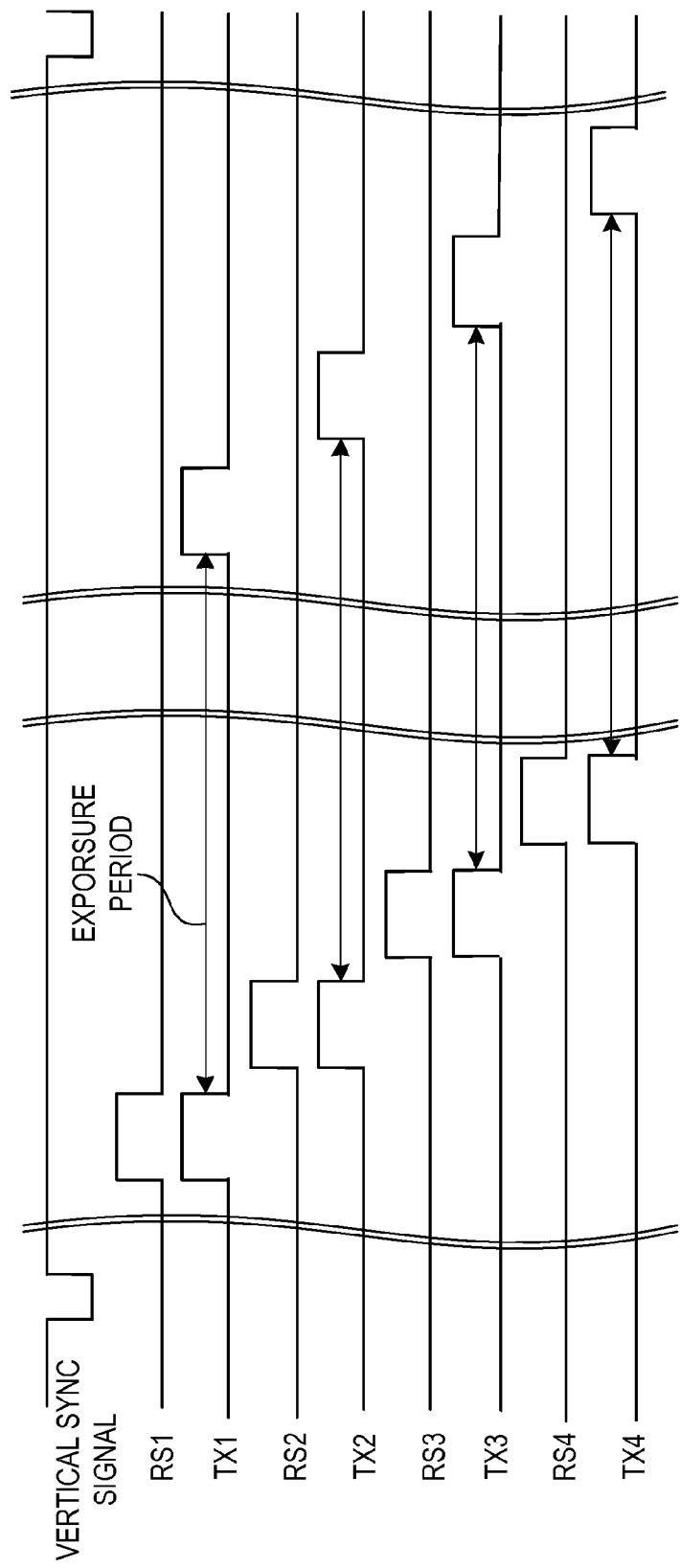
FIG. 4 is a diagram illustrating a timing chart of signals generated in a drive circuit when a normal image is obtained by the imaging element in FIG. 2.

FIG. 4 is a timing chart of TX signals and RS signals generated by the drive circuit 206 when a normal image is obtained by the imaging apparatus according to the exemplary embodiment. Upon a rise of a TX signal and a RS signal, charges in the corresponding photodiodes 202 are reset, whereby exposure starts. This operation is sequentially performed for the arrayed pixels 201 in a predetermined order under conditions set by the TG 114. Subsequently, after passage of predetermined exposure time, the TX signal rises again, whereby charges in the photodiodes 202 are read out to the respective signal amplifiers 204. Imaging signals read out from the signal amplifiers 204 are output through the horizontal scanning circuit 209, and subsequently are subjected to proper processing to obtain image data. This operation is also performed under conditions set by the TG 114.

The imaging element 107 mounted in the imaging apparatus according to the exemplary embodiment is a CMOS-type imaging element. Thus, which row of transfer transistors 203 to drive and in what order to drive the rows can be selected by settings in the shift register in the drive circuit 206, and it is also possible to repeatedly select a same row and read a signal from the row. Also, from which column on a same row to output a signal can be selected by making respective column selection switches 211 operate according to settings in the shift register in the horizontal scanning circuit 209. Consequently, from which pixel in the pixel unit to read out the imaging signal and in what order to perform the readout can be designated.

An operation of the focus adjustment apparatus according to the exemplary embodiment will be described in detail below with reference to FIGS. 5 to 11. This operation is realized by the CPU 113 executing the aforementioned program to control the respective units in the imaging apparatus, and in particular, an AF operation of the focus adjustment apparatus according to the exemplary embodiment is achieved mainly by processing operation performed by the CPU 113 using image data. In this case, for AF operation, a processing unit including a CPU may be provided separately from the CPU 113. Also, except as clearly indicated in the below description of the operation, the CPU 113 mainly performs the operation unless specifically stated.

Figure 5:
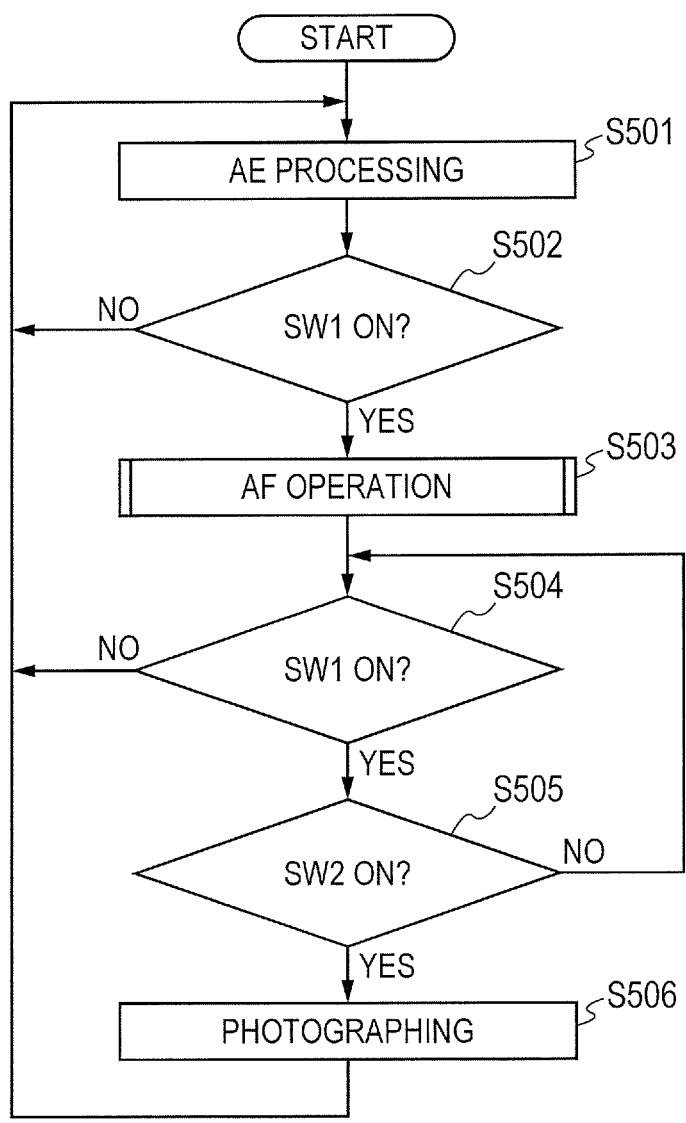
FIG. 5 is a diagram illustrating a flowchart of a photographing operation of the imaging apparatus in FIG. 1.

FIG. 5 illustrates a flowchart of a photographing operation of the imaging apparatus according to the exemplary embodiment. First, in S501, the AE processing unit 103 performs AE processing based on an output of the image processing unit 109 and proceeds to S502. In S502, the state of the SW1 is checked, and if the SW1 is on, the operation proceeds to S503, and if not, the operation returns to S501. In S503, an AF operation, which will be described later, is performed and the operation proceeds to S504. In S504, the state of the SW1 is checked, and if the SW1 is on, the operation proceeds to S505, and if not, the operation returns to S501. In S505, the state of the SW2 is checked, and if the SW2 is on, the operation proceeds to S506, and if not, the operation returns to S504. In S506, photographing is performed, and the operation proceeds to S501 for next photographing.

Figure 6:
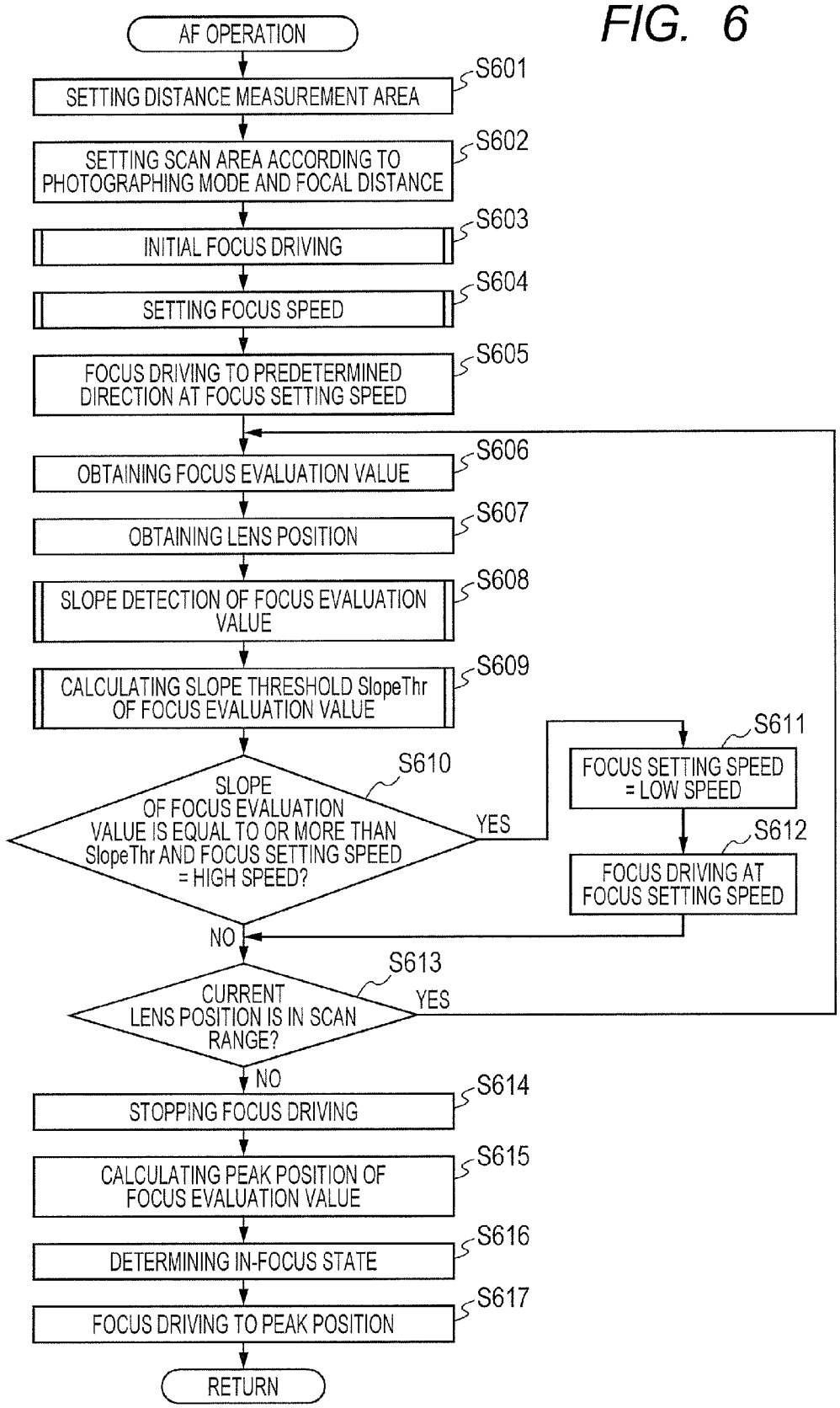
FIG. 6 is a diagram illustrating a flowchart of an AF operation by the focus adjustment apparatus according to the exemplary embodiment of the present invention.

FIG. 6 is a flowchart of the AF operation performed in S503 in FIG. 5. In this operation, a series of operations in S606 to S613 is performed for each of an all-pixel focus evaluation value and an addition focus evaluation value, which will be described later, for a period of time corresponding to one frame in a current frame rate. On the other hand, focus evaluation values used for peak position calculation in S615 are all-pixel focus evaluation values.

First, in S601, a distance measurement area is set in a predetermined area in the screen and the operation proceeds to S602. In S602, a scan area for the focus lens 104 is set according to a photographing mode and a focal distance, and the operation proceeds to S603. In S603, initial focus driving, which will be described later, is performed, and the operation proceeds to S604. The initial focus driving provides determination conditions for setting a speed of driving the focus lens (hereinafter referred to as "focus speed") in S604, performs high-speed peak position detection based on addition signals, and drives the focus lens 104 to a start position for an AF scan in S605. In S604, based on FASTAF determination set by the initial focus driving, later-described focus speed setting is made, and the operation proceeds to S605. In S605, the motor 105 is controlled via the AF processing 106, and driving of the focus lens 104 in a predetermined direction at the focus speed set in S604 is started, and the operation proceeds to S606. The predetermined direction set here is a direction opposite to that of the initial focus driving in S603. In S606, focus evaluation values in the distance measurement area set in S601 are obtained, and the operation proceeds to S607.

Here, the focus evaluation values to be obtained (evaluation value generation) will be described. Using the method described with reference to FIG. 4, an imaging signal read out from all the pixels in an effective pixel area of the imaging element 107 and an imaging signal subjected to thinning out by readout with addition of pixels at predetermined intervals (for example, every three pixels) in a predetermined direction (for example, the horizontal direction) are simultaneously obtained. Next, the obtained respective imaging signals (a first imaging signal and a second imaging signal) are subjected to bandpass filter (hereinafter referred to as "BPF") processing to calculate respective focus evaluation values. Hereinafter, the focus evaluation value calculated from the imaging signal read out from all the pixels is referred to as "all-pixel focus evaluation value" and the focus evaluation value calculated from the imaging signal read out with thinning-out is referred to as "addition focus evaluation value". These focus evaluation values (the first focus evaluation value and the second focus evaluation value) are obtained in parallel at respective frame rates. Here, the addition focus evaluation value has an amount of pixel signals that is smaller than that of the all-pixel focus evaluation value by the amount of the addition for thinning-out. Thus, a frame rate for obtaining an addition focus evaluation value (for example, 180 fps) can be made to be higher than a frame rate for obtaining an all-pixel focus evaluation value (for example, 30 fps). Although in the exemplary embodiment, two types of focus evaluation values, i.e., the addition focus evaluation value and the all-pixel focus evaluation value, are employed, it is possible that another readout method (a third focus evaluation value) is added (for example, thinning-out with a larger number of pixels to be added up) and three or more types of focus evaluation values are calculated in parallel and used.

In S607, a current position of the focus lens 104 is obtained, and the operation proceeds to S608. A method for obtaining a position of a focus lens is a known technique, and thus description thereof will be omitted. Also, storing the focus evaluation values obtained in S606 and the lens position obtained in S607 in association with each other is useful for focus evaluation value slope detection in S608 and focus evaluation value peak position calculation in S615, which will be described later. In such case, since the focus lens 104 is being driven while the focus evaluation values are obtained, the focus lens position is calculated as a timing of a middle of exposure time and then associated with the focus evaluation values.

Figure 12:
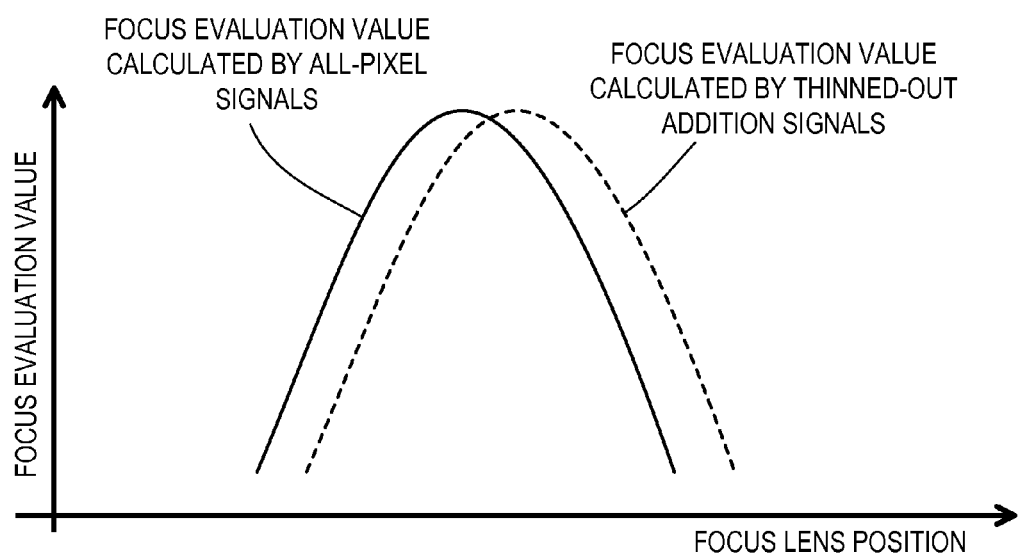
FIG. 12 is a diagram for describing a difference between a focus evaluation value peak position calculated using non-adding signals and a focus evaluation value peak position calculated using thinned-out addition signals.

In S608, slopes of change of the focus evaluation values are detected (the details will be described later), and the operation proceeds to S609. In S609, a slope threshold SlopeThr, which is a threshold for determining a position on a change curve of focus evaluation values (for example, FIG. 12) from a slope of the focus evaluation values, which will be described later, is calculated, and the operation proceeds to step S610. In S610, whether or not the slope detected in S608 is equal to or exceeds the slope threshold SlopeThr calculated in S609 and whether or not the focus speed set in S604 or S611, which will be described later, is set to a high speed are checked. If the settings are so made, the operation proceeds to S611, and if the settings are not so made, the operation proceeds to S613. In S611, the set focus speed is updated to be lower, and the operation proceeds to S612. In S612, focus driving is performed at the set focus speed updated in S611, and the operation proceeds to S613. Consequently, where focus driving is started at high speed at the time of an AF scan start, control to decrease the speed of the focus lens can be performed at a point of time when it is determined that an in-focus position is near. In S613, whether or not the current position of the focus lens 104 obtained in S607 is within the scan area set in S602 is checked, and if the current position is within the scan area, the operation proceeds to S606, and if not, the operation proceeds to S614. In S614, the driving of the focus lens 104 is stopped, and the operation proceeds to S615. In S615, using the focus evaluation values obtained in S606 and the corresponding positions of the focus lens 104 (obtained in S607), a focus evaluation value peak position is calculated and the operation proceeds to S616. As described above, the focus evaluation values used for calculation of the peak position here are all-pixel focus evaluation values. In S616, in-focus state determination is made and the operation proceeds to S617. In S617, the focus lens 104 is driven to the focus evaluation value peak position calculated in S615, and the AF operation is ended, and the operation returns to a main routine from which this AF operation routine is called.

The above-described AF operation enables high-frame rate, high-speed AF control to be performed at a focus lens position away from an in-focus position. Although low-frame rate, low-speed AF control is performed at a position near the in-focus position, use of all-pixel focus evaluation values enables detection of a proper in-focus position for a taken image. Also, in the AF operation in the exemplary embodiment, the speed of driving the focus lens 104 is also set according to the determined in-focus position, enabling further enhancement in speed and accuracy.

In S615, it is possible that a peak position of the addition focus evaluation values is also calculated, and then a difference in peak position between the all-pixel focus evaluation values and the addition focus evaluation values is calculated, and the difference information is stored in the CPU 113 in association with the current photographing conditions. Here, examples of the photographing conditions include, e.g., exposure conditions such as brightness, zoom position, addition focus evaluation value peak position, iris and shutter speed. Consequently, if photographing conditions for subsequent photographing are the same as the stored photographing conditions, the peak position of the all-pixel focus evaluation values can be made to be an in-focus position by correcting the peak of the addition focus evaluation values by the amount of the difference from the peak position corresponding to the photographing conditions. In such case, the focus speed can be set to be constantly high, enabling further enhancement in speed of the AF operation and also enabling maintenance of the AF accuracy.

Next, the initial focus driving in S603 performed in the AF operation in FIG. 6 will be described with reference to the flowchart in FIG. 7. In this initial focus driving, in S703, as in S606 described above, all-pixel focus evaluation values and addition focus evaluation values are obtained in parallel. However, in peak detection check in S705, in order to increase the frame rate to enable detection speed increase, the addition focus evaluation values are used.

First, in S701, the focus setting speed is set to be a low speed, and the operation proceeds to S702. Here, the focus speed set to be a low speed in the initial focus driving is, for example, a minimum speed that enables focus evaluation value slope determination, which will be described later. The focus evaluation values in this case are addition focus evaluation values, and the speed is set based on a frame rate at the time of obtainment of addition focus evaluation value. In S702, focus driving is started in a predetermined direction at the focus setting speed set in S701, and the operation proceeds to S703. Here, for the predetermined direction, a direction in which a probability of existence of an object can be considered high or a direction toward the one of a far end or a near end side which is nearest the current focus lens position is set. In S703, focus evaluation values within the distance measurement area set in S601 are obtained and the operation proceeds to S704. As described above, all-pixel focus evaluation values and addition focus evaluation values are obtained in parallel. In S704, as in S607, a current position of the focus lens 104 is obtained and the operation proceeds to S705. In S705, a later-described peak detection check is performed and the operation proceeds to S706. The peak detection check enables high-speed determination of a current focus state and thus enables enhancement in speed of eventual peak position detection in S615. In S706, whether or not a result of the peak detection check in S705 is "OK" is checked, and if so, the operation proceeds to S709 and if not so, the operation proceeds to S707. In S707, whether or not the result of the peak detection check in S705 is "decrease" and whether or not the number of decreases is larger than a threshold for the number of decreases are checked, and if so, the operation proceeds to S709, and if not so, the operation proceeds to S708. In S708, whether or not the current position of the focus lens 104 reaches an end in the direction of travel of the focus lens 104 is checked, and if so, the operation proceeds to S709, and if not so, the operation returns to S703. In S709, a later-described slope threshold SlopeThr for focus evaluation value is calculated and the operation proceeds to step S710. In S710, whether or not the slope of the focus evaluation value detected in the focus evaluation value slope detection in S608 (the details will be described later) is equal to or exceeds the threshold SlopeThr calculated in S709 is checked, and if so, the operation proceeds to S711, and if not so, the operation proceeds to S712. In S711, FASTAF determination is set to "NG" and the operation proceeds to S713. Here, the FASTAF determination is used for the focus speed setting in S604 (the details will be described later). The FASTAF determination is set based on determination of whether not the current position of the focus lens 104 is near an in-focus position, and thus, can be employed as an index for determining whether or not focus driving is started at a high speed in S605, which is a timing for starting an AF scan operation. In S712, the FASTAF determination is set to "OK", and the operation proceeds to S713. In S713, the focus lens 104 is stopped, and then the operation returns to the initial focus driving routine from which the present routine is called, and proceeds to S604.

Figure 7:
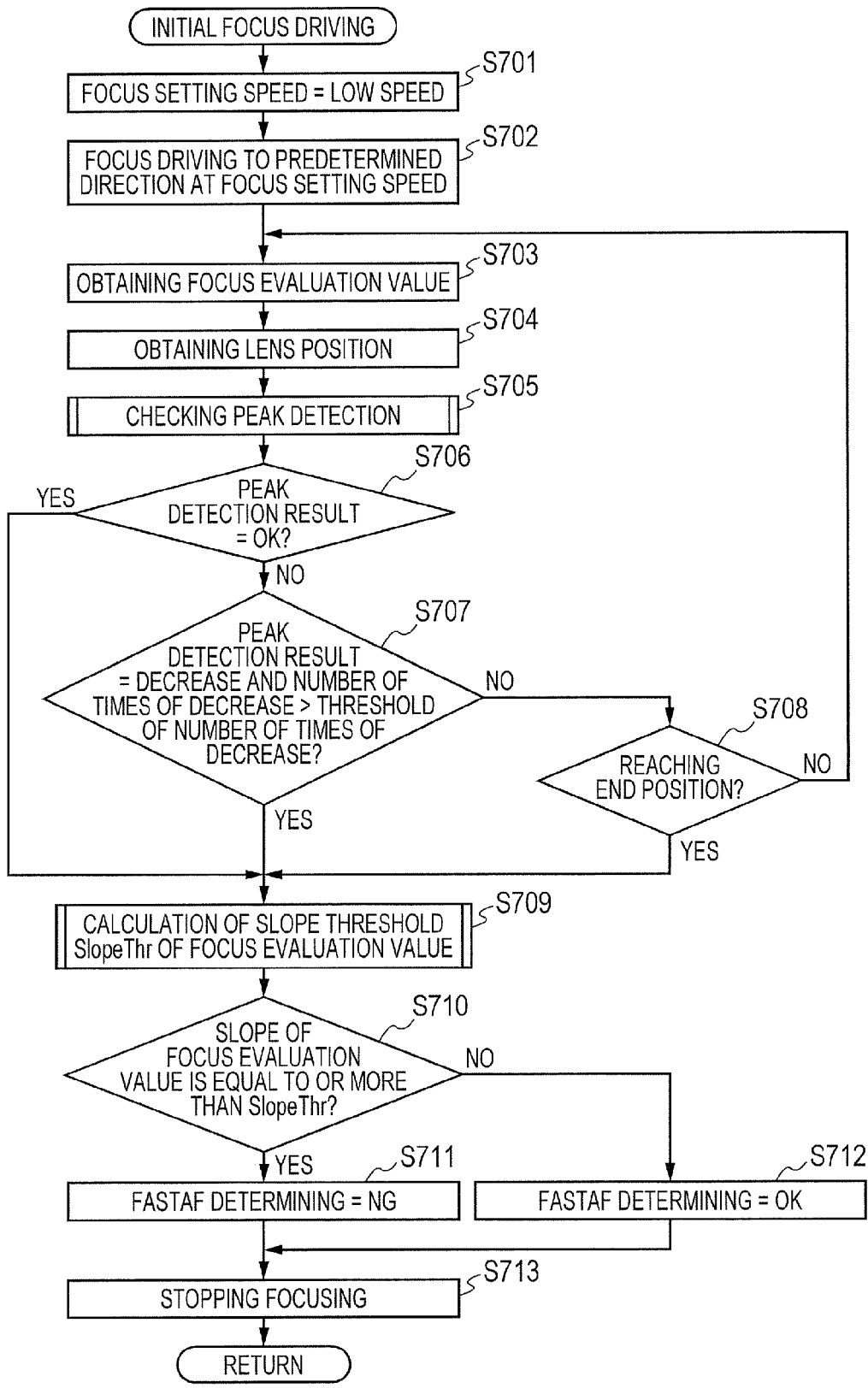
FIG. 7 is a diagram illustrating a flowchart of initial focus driving in the AF operation in FIG. 6.
Figure 8B:
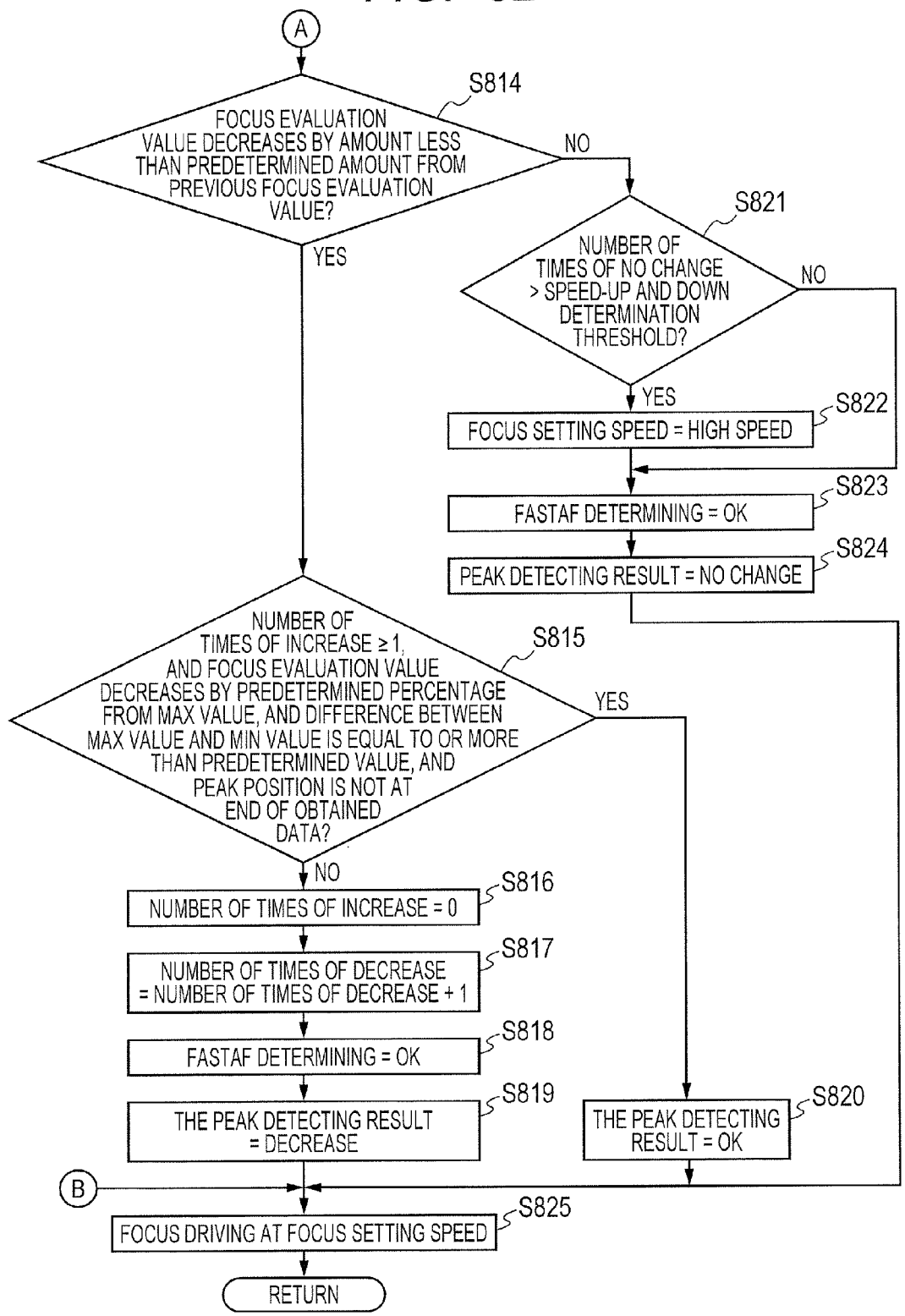
FIG. 8 is comprised of FIGS. 8A and 8B, showing a diagram illustrating a flowchart of a peak detection check operation in the initial focus driving in FIG. 7.

FIGS. 8A and 8B are detailed flowcharts illustrating the peak detection check in S705 in FIG. 7. In the present routine, whether or not a current focus state is one near the focus evaluation value peak is determined at high speed. The focus evaluation values used in S802 to S825 are addition focus evaluation values in order to increase the frame rate and thereby increase the detection speed.

First, in S801, a maximum value and a minimum value of the focus evaluation values obtained up to the present in S703 are obtained and stored, and the operation proceeds to S802. In S802, a slope threshold SlopeThr for the focus evaluation values is calculated (the details will be described later) and the operation proceeds to step S803. In S803, focus evaluation value slope detection (the details will be described later) is performed, and the operation proceeds to S804. In S804, whether or not the focus evaluation value obtained this time has a predetermined amount of increase relative to the focus evaluation value obtained at the previous time is checked, and if so, the operation proceeds to S805, and it not so, the operation proceeds to S814. In S805, the decrease count is cleared to zero and the operation proceeds to S806. The decrease count is cleared each time an increase in focus evaluation value is detected. In S806, the increase count is incremented and the operation proceeds to S807. Consequently, continuation of a focus evaluation value increase is recognized. In S807, whether or not the increase count is larger than a speed-up and down determination threshold is checked, and if so, the operation proceeds to S808, and if not so, the operation proceeds to S811. In S808, whether or not a slope of the focus evaluation values is equal to or exceeds the threshold SlopeThr calculated in S802 is checked, and if so, the operation proceeds to S809, and if not so, the operation proceeds to S810. In S809, it is determined that the focus state is one near the peak position and the set focus speed is updated to a low speed, and the operation proceeds to S812. In S810, the focus setting speed is updated to a high speed and the operation proceeds to S812. In S811, the FASTAF determination is set to "OK", and the operation proceeds to S813. In S813, a peak detection result is set to "increase" and the operation proceeds to S825. In S814, whether or not the current focus evaluation value is decreased from the previous focus evaluation value by a predetermined amount is checked, and if so, the operation proceeds to S815, and if not so, the operation proceeds to S821. In S815, whether or not all of the following four conditions are met is determined, and whether or not the focus state is one near a peak position beyond the peak position is determined: (1) the increase count is no less than one; (2) the current focus evaluation value is decreased from the maximum value of the focus evaluation values stored in S801 by a percentage that is equal to or exceeds a predetermined percentage; (3) a difference between the maximum value and the minimum value stored in S801 is equal to or exceeds a predetermined amount; and (4) the peak position is not an end of the focus evaluation value data obtained to the present time. If all of these four conditions are met, the operation proceeds to S820, and if not, the operation proceeds to S816. In S816, the increase count is cleared to zero and the operation proceeds to S817. In S817, the decrease count is incremented and the operation proceeds to S818. In S818, the FASTAF determination is set to "OK" and the operation proceeds to S819. In S819, the peak detection result is set to "decrease" and the operation proceeds to S825. In S820, the peak detection result is set to "OK" and the operation proceeds to S825. In S821, whether or not the number of no changes in focus evaluation value is larger than the speed-up and down determination threshold is checked, and if so, the operation proceeds to S822, and if not so, the operation proceeds to S823. In S822, the focus speed setting is updated to a high speed and the operation proceeds to S823. In S823, the FASTAF determination is set to "OK" and the operation proceeds to S824. In S824, the peak detection result is set to "no change" and the operation proceeds to S825. In S825, the focus driving is performed at the set focus speed, the operation returns to the initial focus driving routine from which the present routine is called, and returns to S706.

The present peak detection check routine enables higher-speed determination of whether or not an in-focus position is near, based on a shape of addition focus evaluation value change until the focus lens 104 is driven to an AF scan start position. Also, if the focus lens is not near and is away from an in-focus position, the focus lens is driven at high speed, and if the focus lens is near the in-focus position, the focus lens is driven at low speed, enabling reduction of waste in focus driving time.

Figure 9:
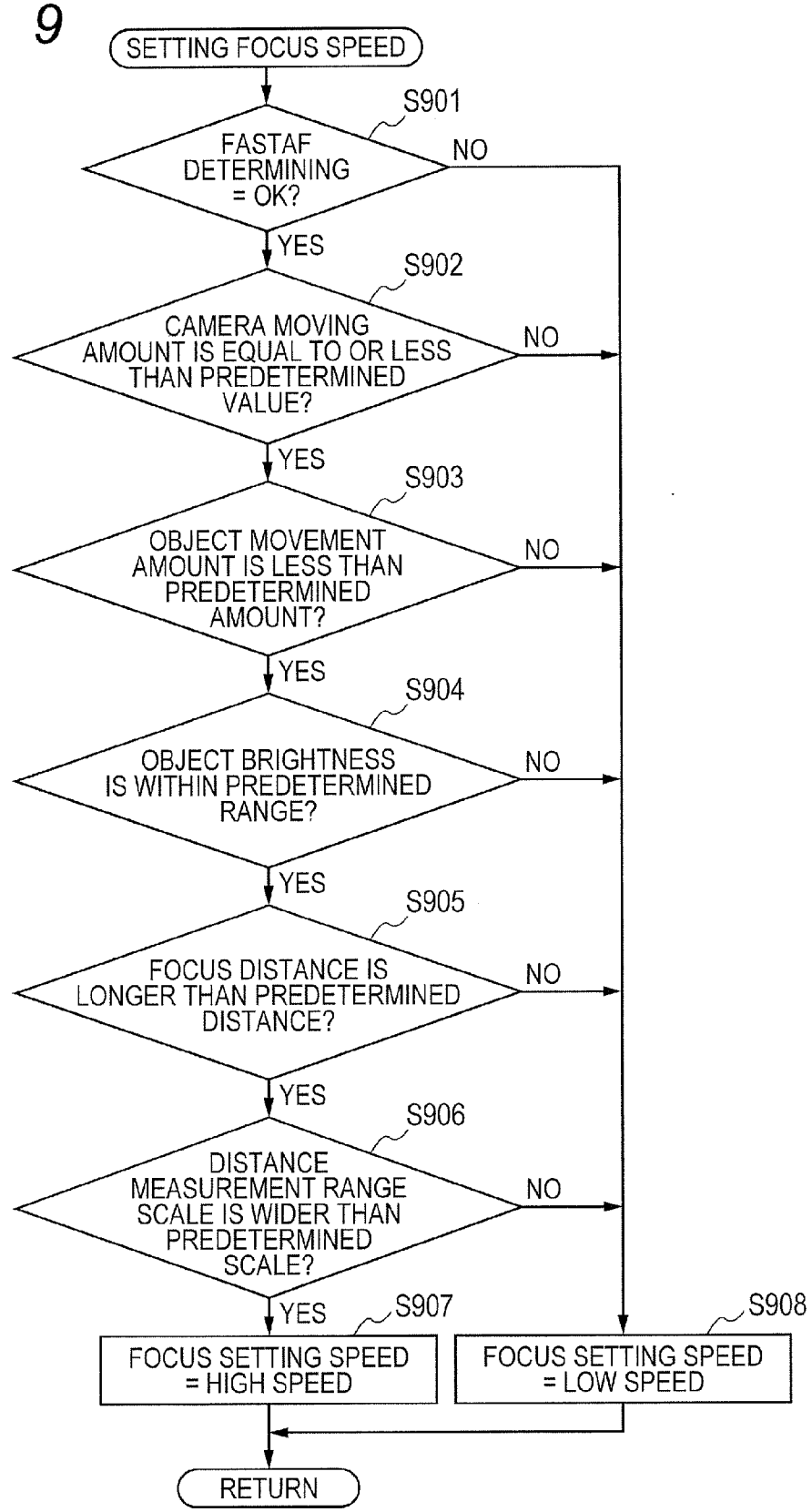
FIG. 9 is a diagram illustrating a flowchart of a focus speed setting operation in the AF operation in FIG. 6.

FIG. 9 is a flowchart of focus speed setting operation performed in S604 in FIG. 6.

First, in S901, whether or not the FASTAF determination set in the initial focus driving operation is "OK" is checked, and if so, the operation proceeds to S902, and if not so, the operation proceeds to S908. In S902, whether or not an amount of camera movement detected by the angular velocity sensor unit 123 is equal to or smaller than a predetermined amount is checked, and if so, the operation proceeds to S903, and if not so, the operation proceeds to S908. Consequently, in the later-described focus evaluation value slope detection in S608, an effect of erroneous detection due to focus evaluation value fluctuation caused by vibration of the imaging apparatus can be reduced. In S903, whether or not a variation in angle of view detected by the moving object detection unit 124 is smaller than a predetermined value is checked, and if so, the operation proceeds to S904, and if not so, the operation proceeds to S908. In S905, whether or not the focal distance is longer than a predetermined distance in the current camera settings is checked, and if so, the operation proceeds to S906, and if not so, the operation proceeds to S908. In S906, whether or not the distance measurement range scale is wider than a predetermined scale in the current camera settings is checked, and if so, the operation proceeds to S907, and if not so, the operation proceeds to S908. In S907, the set focus speed is updated to a high speed, and the operation returns to the AF operation routine from which the present routine is called, and proceeds to S605. Here, the focus speed when set to a high speed is, for example, a maximum speed that enables the slope of the focus evaluation value detection in S608. The focus evaluation values in this case are addition focus evaluation values, and the speed is set based on the frame rate at the time of obtainment of the addition focus evaluation values. In S908, the focus setting speed is updated to a low speed, and the operation returns to the routine from which the present routine is called, and proceeds to S605. Here, the focus speed when set to a low speed is a maximum speed that can ensure the AF accuracy when a peak position is calculated using sampled focus evaluation values. Also, the focus evaluation values in this case are all-pixel focus evaluation values, and the speed is set based on a frame rate at the time of obtainment of the all-pixel focus evaluation values.

Figure 10:
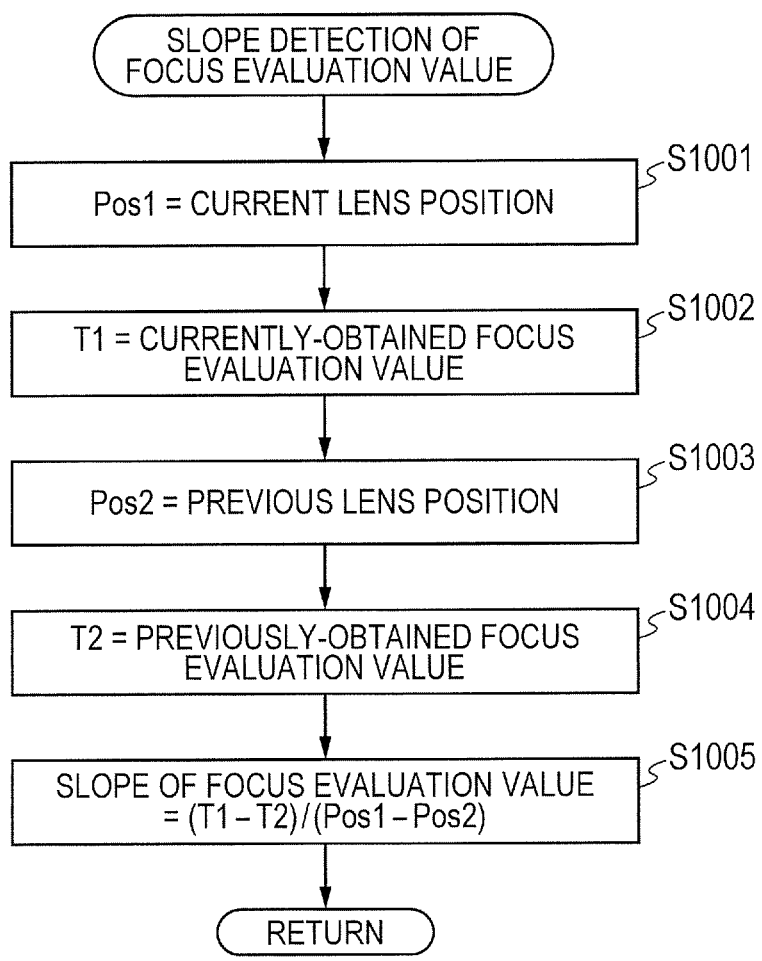
FIG. 10 is a diagram illustrating a flowchart of a focus evaluation value slope detection operation in the AF operation in FIG. 6.

FIG. 10 is a diagram illustrating a flowchart of the focus evaluation value slope detection operation performed in S608 and S802.

First, in S1001, the current lens position obtained in S607 or S704 is set as Pos1 and the operation proceeds to S1002. In S1002, the current focus evaluation value obtained in S606 or S703 is set as T1 and the operation proceeds to S1003. In S1003, the previous lens position obtained in S607 or S704 is set as Pos2 and the operation proceeds to S1004. In S1004, the previous focus evaluation value obtained in S606 or S703 is set as T2 and the operation proceeds to S1005. In S1005, a slope of the focus evaluation values is calculated by (T1−T2)/(Pos1−Pos2), and the operation returns to the routine from which the present routine is called, and proceeds to S609 or S803.

Figure 11:
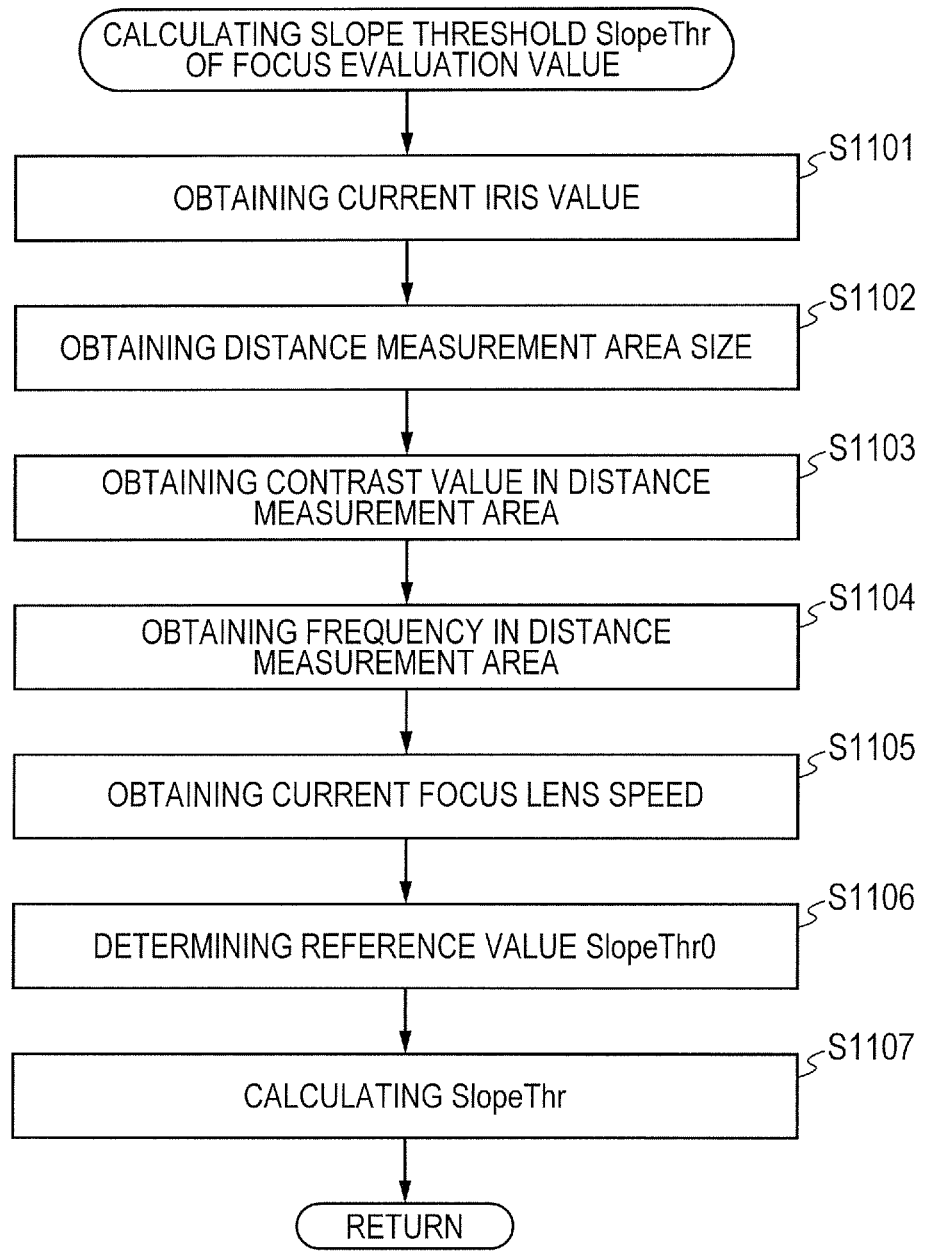
FIG. 11 is a diagram illustrating a flowchart of an operation for calculating a focus evaluation value slope threshold SlopeThr in the AF operation in FIG. 6.

FIG. 11 is a flowchart of an operation of calculation of the focus evaluation value slope threshold SlopeThr in S609, S709 and S803.

First, in S1101, a current state of the iris and shutter 102 is checked to obtain a current iris value, and the operation proceeds to S1102. In S1102, the size of the distance measurement area set in S601 is obtained, and the operation proceeds to S1103. In S1103, a contrast value in the distance measurement area set in S601 is obtained and the operation proceeds to S1104. Here, the contrast value in the distance measurement area is a difference between a maximum value and a minimum value of brightness values in the distance measurement area set in S601. Consequently, even if an object is not brought into focus, a contrast of the object in the distance measurement area can be grasped to a certain degree. In S1104, a frequency in the distance measurement area set in S601 is obtained, and the operation proceeds to S1105. Here, since a method for obtaining the frequency in the distance measurement area is not a point of the present invention, detailed description thereof will be omitted. In S1105, the current lens speed is obtained, and the operation proceeds to S1106. In S1106, a reference value SlopeThr0 for calculating a threshold value SlopeThr in S1107 is determined, and the operation proceeds to S1107. Here, the reference value SlopeThr0 is determined in reference object or camera settings. Also, a method for determining the reference value SlopeThr0 may be changed depending on the use. For example, in the initial focus driving in S603 in FIG. 6, the speed may be decreased at a position beyond an object peak presenting an object so that the object peak can be detected during an AF scan operation to be performed later. On the other hand, during the AF scan operation, it is necessary to reduce the focus lens speed to a focus lens speed required for ensuring AF accuracy before the focus lens moves beyond an object peak position. Therefore, the reference value SlopeThr0 is changed in S709 or S802, which is during initial focus driving before the AF scan, and in S609, which is during the AF scan operation. In S1107, the focus evaluation value slope threshold SlopeThr is calculated according to the below expression, and the operation returns to the routine from which the present routine is called, and proceeds to S610, S709 or S803. Here, the threshold SlopeThr is calculated according to, for example, the below calculation expression:

$$SlopeThr = SlopeThr0 \times MMP \times WinSize \times Freq/Speed/FNum,$$

wherein FNum is a factor determined by the iris value, MMP is a factor determined by the contrast in the distance measurement area, Freq is a factor determined by the frequency in the distance measurement area, WinSize is a factor determined by the distance measurement area size, and Speed is a factor determined by the focus lens speed. Consequently, even if the shape formed by the focus evaluation values varies depending on the object or camera settings, an object peak position can properly be determined.

The above-described exemplary embodiment of the present invention enables provision of a focus adjustment apparatus that can perform high-speed AF while AF accuracy is maintained, by performing AF control using an all-pixel focus evaluation value and an addition focus evaluation value simultaneously output from one imaging element, and an imaging apparatus including the same.

Although the present invention has been described in detail based on suitable exemplary embodiments thereof, the present invention is not limited to such particular embodiments, and various modes that fall within a scope not departing from the spirit of the present invention also fall under the scope of the present invention. Parts of the above-described embodiments may be combined as appropriate. Also, a case where a software program that provides the functions of the above-described embodiment is supplied to a system or an apparatus including a computer that can execute the program, directly or via wire or wireless communication from a storage medium and the program is executed also falls under the scope of the present invention. Therefore, program code supplied to, or installed in, a computer in order to realize the functional processing in the present invention via the computer themselves also provide the present invention. In other words, a computer program for realizing the functional processing in the present invention itself falls under the scope of the present invention. In such case, any form of program such as object code, a program executed by an interpreter or script data supplied to the OS can be employed as long as such form has a function of a program. A storage medium that can be read by a computer for supplying a program may be, for example, a magnetic recording medium such as a hard disk or a magnetic tape, an optical/magnetooptical storage medium or a non-volatile semiconductor memory. Also, for a program supply method, a method in which a computer program that provides the present invention is stored in a server on a computer network, and a client computer that has accessed the server downloads the computer program for programming may be employed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-236000, filed Nov. 14, 2013, which is hereby incorporated by reference herein in its entirety.

What is claimed is:

1. A focus adjustment apparatus that, based on imaging signals obtained by causing an imaging unit to pick up an optical image of an object formed via a photographing optical system including a focus lens, adjusts a position of the focus lens, the apparatus comprising:
a read out control unit that performs control so that, in parallel with an operation of reading out first imaging signals from the imaging unit at a predetermined frame rate, second imaging signals are read out from the imaging unit at a frame rate that is higher than the predetermined frame rate, the number of the second imaging signals being smaller than the number of the first imaging signals;
a generation unit that generates a first focus signal using the first imaging signals and that generates a second focus signal using the second imaging signals; and
a control unit that performs control so that a first focus adjustment that adjusts the position of the focus lens based on the first focus signal is performed if it is determined that the focus lens is near an in-focus position, and so that a second focus adjustment that adjusts the position of the focus lens based on the second focus signal is performed if it is determined that the focus lens is not near the in-focus position.

2. The focus adjustment apparatus according to claim 1, wherein the control unit detects changes in the first focus signal and the second focus signal and slopes of the changes, determines whether a focus state of the optical image of the object is a state near an in-focus position, in front of the in-focus position or behind the in-focus position based on the change and the slope detected from the second focus signal, and determines whether the focus state of the optical image of the object is a state near the in-focus position based on the slope detected from the first focus signal.

3. The focus adjustment apparatus according to claim 2, further comprising a setting unit that sets a speed of driving the focus lens at least according to a result of the determination made by the control unit, wherein
if the control unit determines that the focus state of the optical image of the object is a state near the in-focus position, the setting unit sets the speed of driving the focus lens so as to be low, and if the control unit determines that the focus state of the optical image of the object is not one near the in-focus position, the setting unit sets the speed of driving the focus lens so as to be high.

4. The focus adjustment apparatus according to claim 3, wherein if the control unit determines the focus state of the optical image of the object based on the second focus signal, the setting unit sets the speed of driving the focus lens according to the determination based on the second focus signal and a photographing condition for the object, and if the determination based on the second focus signal indicates that the focus state of the optical image is not a state near the in-focus position, the setting unit sets the speed of driving the focus lens according to the photographing condition.

5. The focus adjustment apparatus according to claim 1, wherein the control unit stores information on a difference between the first focus signal and the second focus signal together with the photographing condition for the object in a storage unit.

6. The focus adjustment apparatus according to claim 5, wherein if the photographing condition for the object is the same as a photographing condition stored in the storage unit, the control unit determines an in-focus position in the second focus adjustment that adjusts the position of the focus lens according to the determination of a focus state of the optical image of the object based on the second focus signal, and based on the in-focus position determined by the second focus adjustment and the difference information stored together with the photographing condition, determines the in-focus position that is determined by the first focus adjustment adjusting the position of the focus lens according to determination of the focus state of the optical image of the object based on the first focus signal.

7. The focus adjustment apparatus according to claim 1, wherein
the read out control unit further reads out third imaging signals the number of which is different from the number of the second imaging signals, and
the control unit further generates a third focus signal using the third imaging signals.

8. An imaging apparatus comprising:
a photographing optical system including a focus lens;
an imaging unit including an array of pixels that picks up an optical image of an object formed via the photographing optical system and that outputs imaging signals;
a read out control unit that, in parallel with an operation of reading out first imaging signals at a predetermined frame rate, reads out second imaging signals at a frame rate that is higher than the predetermined frame rate, the number of the second imaging signals being smaller than the number of the first imaging signals, and that outputs the first imaging signals and the second imaging signals simultaneously from the imaging unit;
a generation unit that generates a first focus signal and a second focus signal using the first imaging signals and the second imaging signals, respectively;
a control unit that performs a first focus adjustment that adjusts a position of the focus lens based on the first focus signal if it is determined that the focus lens is near an in-focus position, and performs a second focus adjustment that adjusts the position of the focus lens based on the second focus signal if it is determined that the focus lens is not near an in-focus position; and
a drive unit that drives the focus lens according to the in-focus position determined by the control unit.

9. The imaging apparatus according to claim 8, further comprising a setting unit that sets a speed of driving the focus lens at least according to a result of the determination made by the control unit, wherein
the drive unit drives the focus lens at the driving speed set by the setting unit.

10. The imaging apparatus according to claim 9, wherein
the read out control unit outputs third imaging signals, the number of which is different from that of the second imaging signals, from the imaging unit simultaneously with the first imaging signals and the second imaging signals, and the control unit further generates a third focus signal using the third imaging signals.

11. A focus adjustment method for, based on an imaging signals obtained by picking up an optical image of an object formed via a photographing optical system including a focus lens, adjusting a position of the focus lens, the method comprising:

performing read out control so that, in parallel with an operation of reading out first imaging signals from the imaging unit at a predetermined frame rate, second imaging signals are read out from the imaging unit at a frame rate that is higher than the predetermined frame rate, the number of the second imaging signals being smaller than the number of the first imaging signals;

generating a first focus signal and a second focus signal using the first imaging signals and the second imaging signals, respectively; and performing a first focus adjustment that adjusts the position of the focus lens based on the first focus signal if it is determined that the focus lens is near an in-focus position, and performing a second focus adjustment that adjusts the position of the focus lens based on the second focus signal if it is determined that the focus lens is not near the in-focus position.

12. A non-transitory computer-readable storage medium storing a program for causing a computer to execute a focus adjustment method according to claim 11.

* * * * *